United States Patent [19]
Riegler et al.

[11] 3,936,102
[45] Feb. 3, 1976

[54] BEARING ASSEMBLY FOR ACCOMMODATING ANGULAR DISPLACEMENTS IN TORQUE-TRANSMITTING TRUNNIONS

[75] Inventors: Ernst Riegler, Enns; Manfred Schmidt, Linz, both of Austria

[73] Assignee: Vereinigte Osterreichische Eisen- und Stahlwerke-Alpine Montan Aktiengesellschaft, Linz, Austria

[22] Filed: Jan. 2, 1975

[21] Appl. No.: 538,141

[30] Foreign Application Priority Data
Jan. 10, 1974  Austria ................................. 169/74

[52] U.S. Cl. .............. 308/72; 266/36 P; 308/207 R; 308/237 R
[51] Int. Cl.² ......................................... F16C 23/00
[58] Field of Search ............. 308/6 R, 72, 176, 207, 308/237 R; 266/35 R, 36 P, 36 H

[56] References Cited
UNITED STATES PATENTS
| | | | |
|---|---|---|---|
| 2,976,090 | 3/1961 | McFeaters | 308/6 R X |
| 3,350,144 | 10/1967 | Beckman et al. | 308/176 X |

*Primary Examiner*—M. Henson Wood, Jr.
*Assistant Examiner*—Gene H. Church
*Attorney, Agent, or Firm*—Brumbaugh, Graves, Donohue & Raymond

[57] ABSTRACT

A bearing assembly for accommodating angular displacements in torque-transmitting trunnions, has a spherical-face-shaped hub on the trunnion and a trunnion receiving bushing, both with toothings meshing with one another. A bearing comprised of inner rings and outer rings is inserted between the bushing and the trunnion. The bearing assembly is particularly suited for a tiltable converter with a carrying ring, in which the bushing is inserted into the carrying ring and the trunnion of the driving toothed wheel protrudes into the bushing.

6 Claims, 4 Drawing Figures

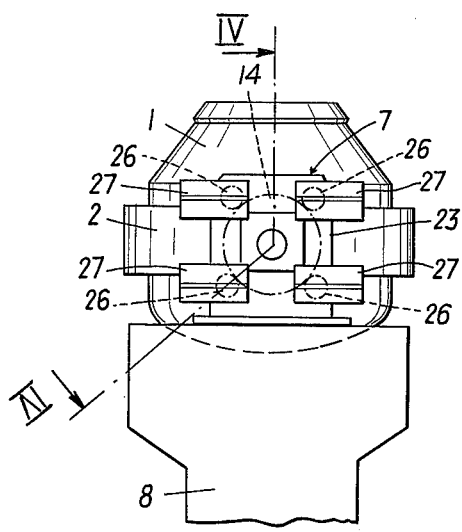
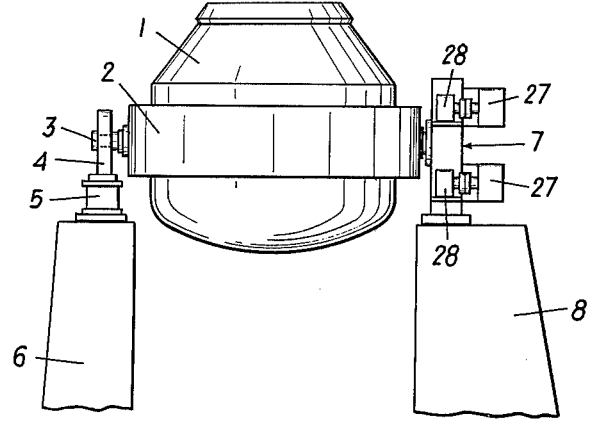
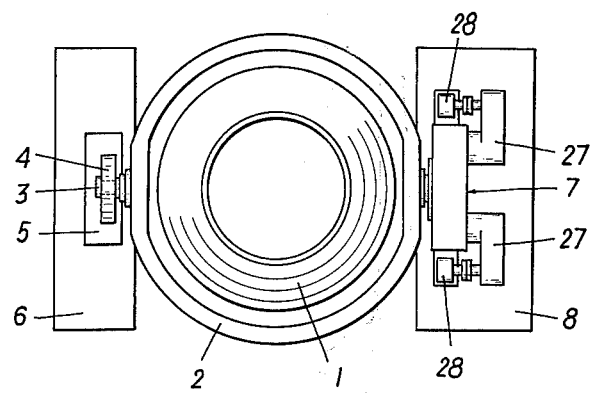

BEARING ASSEMBLY FOR ACCOMMODATING ANGULAR DISPLACEMENTS IN TORQUE-TRANSMITTING TRUNNIONS

BACKGROUND OF THE INVENTION

This invention relates to a bearing assembly for accommodating angular displacements in torgue-transmitting trunnions, such as converter carrying trunnions.

In the field of general engineering it is customary to mount a shaft in a fixed bearing on one side, and in an expansion bearing on the other side in order to accommodate thermal expansions and assembly deficiencies, respectively, and to guarantee smooth operation. Also in a converter plant it is customary to mount a converter carrying ring in a fixed bearing with one carrying trunnion and in an expansion bearing with the other carrying trunnion. These known constructions have, however, the disadvantage that between the converter carrying ring and the actual drive, which comprises a spur gear wheel, an intermediate gear and a motor, a separate bearing support construction which requires an adequate amount of space, is necessary. This is especially unfavorable when already existent converter plants, e.g. in the course of capacity expansions, are reconstructed and must be built into already existent hall constructions. A further disadvantage is that for accommodating displacements that occur, separate machine elements, such as pendulum roller bearings, have to be provided. These elements are comparatively far away from the middle of the carrying ring profile and, consequently, considerable eccentric paths have to be covered during the tilting of the converter. Finally, in known converter bearing constructions difficulties occur when the trunnion is bound into the carrying ring by welding, if quenched and subsequently tempered materials, which would be preferred for their strength are used. Therefore, quenched and subsequently tempered materials are not ordinarily used; but, instead steels with a hot yield point of up to 25 kp/mm$^2$ are used because they need not be heated up during welding. Therefore, it is necessary to put up with an over-dimensioning of the trunnions.

SUMMARY OF THE INVENTION

It is the object of the invention to avoid these disadvantages and difficulties and to create a bearing assembly, especially a fixed bearing assembly for converters, in which the points of displacement are near the places in which they occur, i.e. very near to the middle of the carrying ring profile or trunnion axis.

Thus in a bearing for accommodating angular displacements in torque transmitting trunnions, such as converter carrying trunnions, the invention comprises applying a spherical-zone-shaped hub, with an external toothing following the spherical face, to the trunnion protruding into a bushing of the driving or driven machine part. The external toothing meshes with a straight counter toothing of the bushing. Also, a bearing comprised of inner rings and outer rings is located between the bushing and the trunnion and its mutual running faces are in the form of spherical faces with a common center.

A preferred field of application of the invention is a fixed bearing assembly for a converter, wherein a bushing is inserted into the carrying ring of the converter. Into this bushing the trunnion of a driving toothed wheel protrudes so that the external toothing on the spherical-zone-shaped hub of the trunnion meshes with a counter toothing provided on the inside of the bushing.

Advantageously, play is provided between the top circle of the external toothing and the root circle of the internal toothing, so as to free the toothing from load.

Suitably, the driving toothed wheel is enclosed in a housing secured to the base without a separate torque support.

The invention makes it possible to produce the trunnion of quenched and subsequently tempered steel and to dimension it according to the expected wear, i.e. to make full use of the strength properties of the quenched and subsequently tempered steel without overdimensioning the trunnion.

BRIEF DESCRIPTION OF THE DRAWINGS

In order that the invention may be more fully understood, an embodiment thereof will now be described by way of example, with reference to the accompanying drawings in which:

FIG. 1 shows a general view of a converter plant,

FIGS. 2 and 3 show the corresponding plan and side views, respectively, and

DESCRIPTION OF A PREFERRED EMBODIMENT

Figure 4:
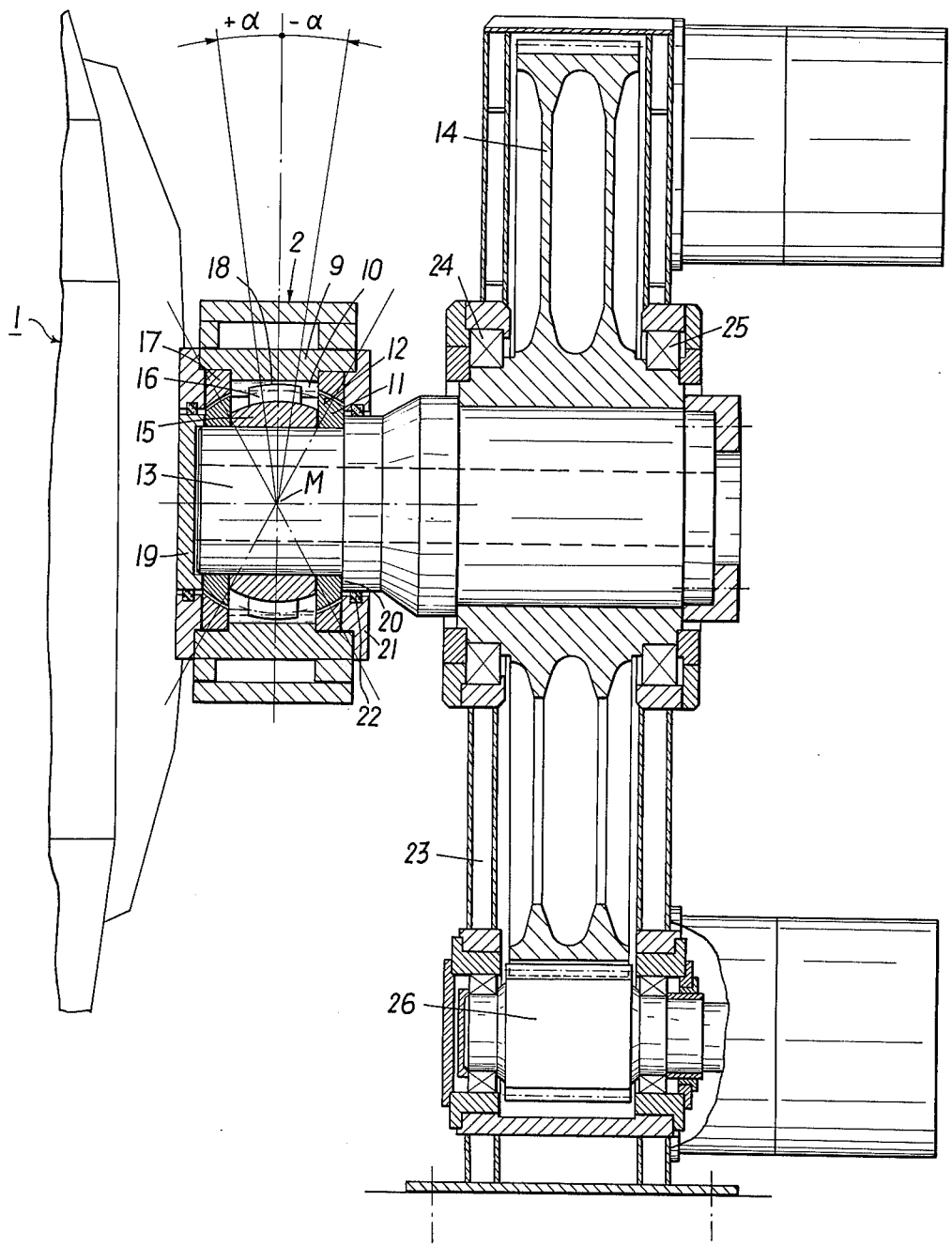
FIG. 4 shows an example for the fixed bearing construction of a converter in a section along IV-IV of FIG. 3.

In the drawings the converter is denoted with 1, the carrying ring with 2, the expansion bearing trunnion with 3, the expansion bearing housing with 4, the expansion bearing stand with 5, and the base on the side of the expansion bearing with 6. The converter drive is generally denoted with 7 and the base on the side of the drive with 8.

As can be seen in FIG. 4, a bushing 9 is welded into the carrying ring 2 on the fixed bearing side. The inner side of the bushing has a straight toothing 10. The outer rings 17 of the bearing according to the invention have spherical running faces 12 and are secured to the bushing. Into the bushing a trunnion 13 protrudes which forms a one-piece unit with the driving toothed wheel 14. On the part of the trunnion protruding into the bushing, a spherical-zone-shaped hub 15 is provided. This hub has an arcuate toothing 16 that meshes with the counter toothing 10. On both sides of the hub, inner rings 11 of the bearing, also having spherical running faces 12, are provided on the trunnion and enclose the toothings of the trunnion and the bushing. The spherical faces 12 of the rings 11 and 17 and the arcuate toothing 16 have a common center M lying in the trunnion axis. The bearing is dimensioned in such a way that between the top circle of the toothing 16 and the root circle of the toothing 10 a slight play 18 is provided which frees the toothings from load. It is understandable that during a displacement the outer rings and inner rings of the bearing pivot against one another and thus angular displacements of $\pm\alpha$ can be accommodated.

On the side of the converter an end lid 19 is provided on the bearing and braces the bearing against the shoulder-like step 20 of the trunnion. On the side of the drive there is a closing ring 21 which provides for a sealing toward the trunnion with seals 22. The toothed wheel 14 is inserted in a housing 23 secured to the base 8.

Since the housing is secured to the base, a separate torque support becomes superfluous. Reference numbers 24 and 25 denote slide, articulation, or ball and roller bearings, one of which acts as a fixed bearing and the other one as an expansion bearing. Furthermore, four pinions 26 are flanged to the housing, together with intermediate gearing 27 and motors 28, as can be seen in FIGS. 2 and 3 in greater detail. According to the invention a quenched and subsequently tempered steel can be used for the trunnion 13, since it is not welded into the carrying ring and thus no problems occur due to pre-heating. Therefore, the trunnion can be constructed according to the wear and stresses and can be optimally dimensioned, i.e. it need not be over-dimensioned.

What we claim is:

1. A bearing assembly for accommodating angular displacements in a torque-transmitting trunnion, such as a converter-carrying trunnion, comprising
   - a hub with a spherical face provided on the trunnion and having an external toothing following the spherical face,
   - a trunnion-receiving bushing having a straight counter toothing meshing with the outer toothing of the hub, and
   - a bearing container inner rings and outer rings provided between the bushing and the trunnion and having spherical faces acting as mutual running faces, which running faces have a common center.

2. A bearing assembly according to claim 1 to be used as a fixed bearing for a tiltable converter further comprising a driving toothed wheel connected with the trunnion, wherein the trunnion-receiving bushing is inserted into the carrying ring of the tiltable converter.

3. A bearing assembly according to claim 1 to be used as a fixed bearing, wherein, for freeing the toothings from load, the external toothing has a top circle arranged with play relative to the counter toothing root circle.

4. A fixed bearing according to claim 2, comprising a base-secured housing accommodating the driving toothed wheel without a separate torque-support.

5. A fixed bearing according to claim 4, wherein at least one pinion together with intermediate gearing and motors is flanged to the base-secured housing.

6. A bearing assembly according to claim 1, wherein the trunnion consists of quenched and subsequently tempered steel.

* * * * *